United States Patent
Beloussov et al.

(10) Patent No.: US 11,449,231 B2
(45) Date of Patent: Sep. 20, 2022

(54) SYSTEMS AND METHODS FOR MODIFYING STORAGE SYSTEM CONFIGURATION USING ARTIFICIAL INTELLIGENCE

(71) Applicant: Acronis International GmbH, Schaffhausen (CH)

(72) Inventors: Serguei Beloussov, Costa Del Sol (SG); Oleg Melnikov, Moscow (RU); Kirill Korotaev, Moscow (RU); Sergey Ulasen, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 0 days.

(21) Appl. No.: 17/308,121

(22) Filed: May 5, 2021

(65) Prior Publication Data
US 2021/0255769 A1 Aug. 19, 2021

Related U.S. Application Data

(63) Continuation of application No. 16/536,681, filed on Aug. 9, 2019, now Pat. No. 11,023,133.

(60) Provisional application No. 62/718,991, filed on Aug. 16, 2018.

(51) Int. Cl.
*G06F 3/06* (2006.01)
*G06N 20/00* (2019.01)

(52) U.S. Cl.
CPC ............ *G06F 3/061* (2013.01); *G06F 3/0634* (2013.01); *G06F 3/0653* (2013.01); *G06F 3/0673* (2013.01); *G06N 20/00* (2019.01)

(58) Field of Classification Search
CPC ...... G06F 3/061; G06F 3/0634; G06F 3/0653; G06F 3/0673; G06N 20/00
See application file for complete search history.

(56) References Cited

U.S. PATENT DOCUMENTS

| 8,327,103 | B1 ‡ | 12/2012 | Can | G06F 3/0685 |
| | | | | 711/165 |
| 2003/0191909 | A1 ‡ | 10/2003 | Asano | G06F 11/3433 |
| | | | | 711/154 |
| 2016/0224277 | A1 ‡ | 8/2016 | Batra | G06F 11/3034 |
| 2018/0373437 | A1 ‡ | 12/2018 | Navon | G06F 3/0679 |
| 2020/0257581 | A1 * | 8/2020 | Darwin | G06F 11/0793 |
| 2020/0401528 | A1 * | 12/2020 | Sharma | G06F 3/0608 |
| 2020/0409561 | A1 * | 12/2020 | Shaw | G06F 3/0679 |

\* cited by examiner
‡ imported from a related application

*Primary Examiner* — Sean D Rossiter
(74) *Attorney, Agent, or Firm* — ArentFox Schiff LLP; Michael Fainberg

(57) ABSTRACT

Methods and systems are provided for modifying configuration of a storage system using artificial intelligence. An exemplary method comprises collecting, over a period of time, health and parameter information of the storage system. The method comprises predicting, using a machine learning algorithm, upcoming events that may degrade performance of the storage system based on the health and parameter information. The method comprises determining that the storage system will not operate in accordance with a set of goals based on the upcoming events. In response to determining that the storage system will not operate in accordance with the set of goals, the method comprises generating parameter changes, and applying the parameter changes to the storage system.

20 Claims, 5 Drawing Sheets

SYSTEMS AND METHODS FOR MODIFYING STORAGE SYSTEM CONFIGURATION USING ARTIFICIAL INTELLIGENCE

CROSS-REFERENCE TO RELATED APPLICATIONS

This application is a continuation of U.S. Non-Provisional application Ser. No. 16/536,681, and claims the benefit of U.S. Provisional Application No. 62/718,991 filed on Aug. 16, 2018, which is hereby incorporated in its entirety, herein.

FIELD OF TECHNOLOGY

The present disclosure generally relates to the field of electronic data storage, and, more specifically, to systems and methods for modifying storage system configuration using artificial intelligence.

BACKGROUND

In order for storage systems to maximize their performance and meet particular goals and purposes, the systems should be configured in a proper manner. Storage system configuration can include multiple levels: a Hardware level, a system environment level and a storage system level. The hardware level may include configuration of HDD controllers, RAID controllers, and the like. Hardware vendors generally defines the parameters for these hardware devices. Configuration of this hardware can be implemented in firmware, which is usually embedded into hardware. Configuration of the system environment level includes network protocols (e.g., TCP/IPO), data transmission parameters (e.g. MTU—Maximum Transmission Unit), and the like. Finally, configuration at the storage system level includes many unique and specific parameters which help to achieve the optimal performance rate for the system, depending on multiple factors.

Traditionally, technical specialists perform the configuration of a storage system. System administrators may resolve simple performance issues by modifying particularly well known configuration parameters. Alternatively, experts (e.g., Amazon® or Microsoft® certified) may be called in to configure particularly complex or critical aspects of a storage system. However, even an expert cannot configure and optimize hundreds or thousands of parameters that may apply to a given storage system or several such systems. No single person can analyze and adjust thousands parameters and all their possible combinations.

Accordingly, there is a need for a system and method for modifying storage system configuration using machine learning and artificial intelligence.

SUMMARY

The present disclosure provides an effective solution for the foregoing problems of conventional techniques associated with maintenance of storage systems. Disclosed are example systems, methods and computer program products for modifying storage system configuration using machine learning and artificial intelligence.

In an exemplary aspect, a disclosed method comprises storing an initial configuration of the storage system as configuration parameters, collecting health information and parameter information related to the storage system over a period of time, wherein the health information comprises at least information about performance of the storage system, analyzing the collected health information and the parameter information using machine learning by comparing the health and the parameter information to a set of goals of the storage system, determining that the storage system is not operating in accordance with the set of goals, in response to determining that the storage system is not operating in accordance with the set of goals, identifying a problem with the storage system using artificial intelligence by analyzing the health information and generating parameter changes that correct the problem, updating the configuration parameters with the parameter changes and applying the parameter changes to the storage system to correct the problem and restore performance of the storage system.

In another aspect, identifying the problem further comprises: generating a set of rules based on the collected health information and the parameter information, comparing the health information with the set of rules, determining the problem with the storage system based on match between the health information and the set of rules.

In another aspect, the method further comprises: determining whether a usage scenario of the storage system has changed to a new usage scenario, identifying one or more parameter changes that will increase performance of the storage system for the new usage scenario and applying the one or more parameter changes to the storage system.

In another aspect, the method further comprises: predicting upcoming events or patterns of events that may degrade performance of the storage system, determining which rules match the upcoming events or the patterns, determining, based on the matching rules, a set of configuration changes and updating the configuration parameters with the set of configuration changes.

In another aspect, the method further comprises: generating, based on the collected health information and the parameter information, a schedule of parameter changes for a future period of time, and applying the parameter changes over the period of time.

In another aspect, determining that the storage system is not operating in accordance with the set of goals further comprises one or more of: determining that the storage system has not processed more than a predetermined threshold amount of requests within a predetermined time period, determining that efficiency of the storage system is below a predetermined threshold efficiency value and determining that a current pattern of operation of the storage system is similar to a historical pattern of operation that degraded performance.

In another aspect, configuration of the storage system comprises one or more of system level parameters, environmental level parameters and hardware level parameters.

In another aspect, the environmental level parameters comprise network protocol parameters.

In another aspect, the hardware level parameters comprise one or more of parameters of hard disk drive (HDD) controllers and parameters of RAID controllers.

In another aspect, the method further comprises: storing the configuration parameters in a persistent configuration parameter table.

According to another exemplary aspect, a system is provided comprising a hardware processor configured to perform any aspects of the disclosure described herein.

According to another exemplary aspect, a computer-readable medium is provided comprising instructions for performing any of aspects of the disclosure described herein.

The above simplified summary of example aspects serves to provide a basic understanding of the present disclosure.

This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
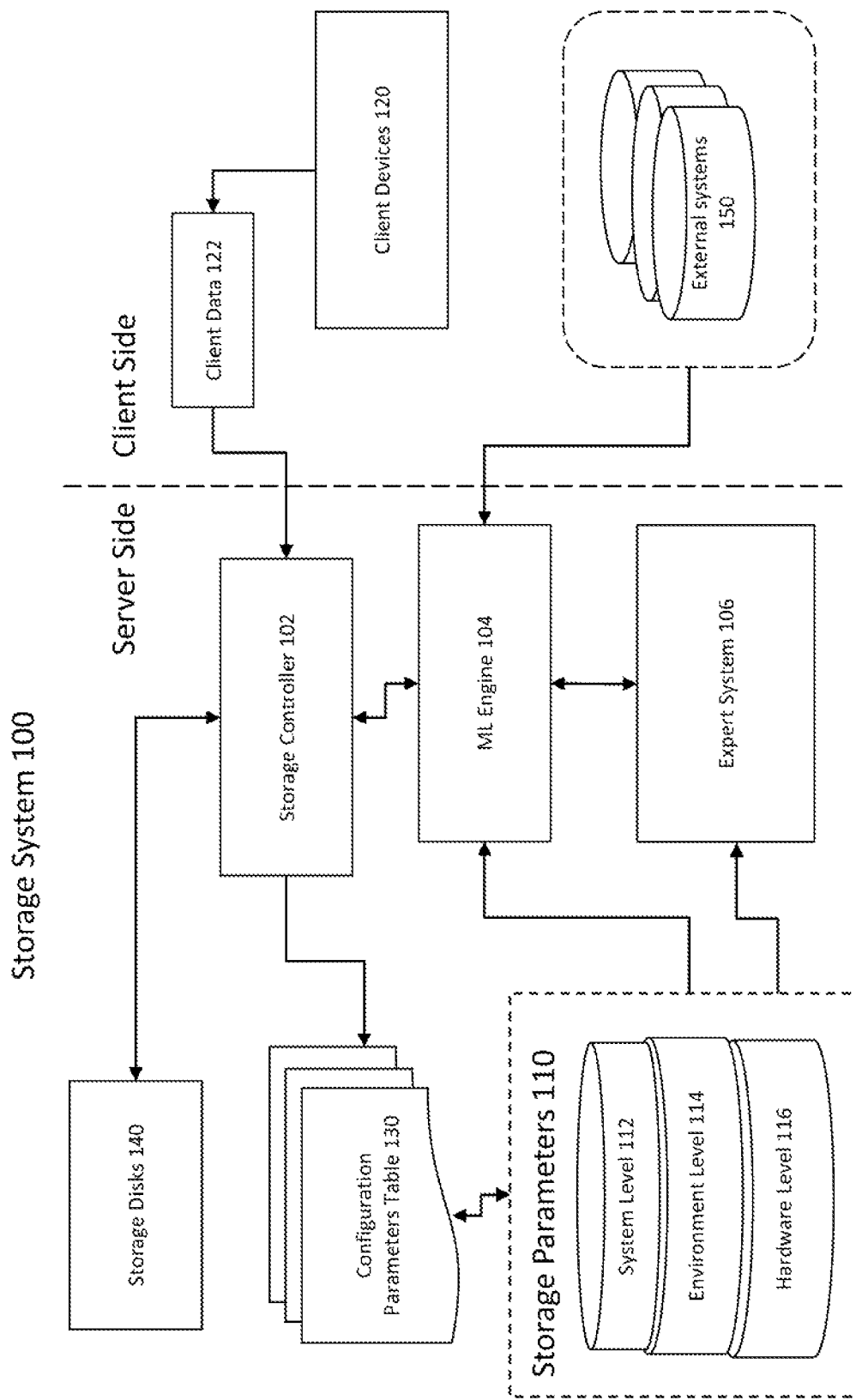
FIG. 1 illustrates a block diagram of a system for modifying storage system configuration using machine learning and artificial intelligence.

Various aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a simplified summary of one or more aspects in order to provide a basic understanding of the aspects. This summary is not an extensive overview of all contemplated aspects, and is not intended to identify key or critical elements of all aspects nor delineate the scope of any or all aspects.

As described herein, a method and system is disclosed for modifying configuration of data storage systems, such as an online/remote file storage service or cloud computing service. Examples of such services include Amazon® Simple Storage Service ("S3"), and Microsoft® Azure Blob ("Azure").

In general, companies such as Microsoft® and Amazon® set up networks and infrastructure to provide one or more multi-client services (such as various types of cloud-based storage) that are accessible via the Internet and/or other networks to a distributed set of clients in a company, organization or the like. These data storage companies will herein be referred to as storage service providers. These storage service providers can include numerous data centers that can be distributed across many geographical locations and that host various resource pools, such as collections of physical and/or virtualized storage devices, computer servers, networking equipment and the like, needed to implement, configure and distribute the infrastructure and services offered by the storage service provider.

Each storage provider provides storage services and operates on a set of goals and looks to achieve one or more particular purposes. As events occur in the storage system, the configuration of the system should be modified to maximize the possibility of achieving the goals and purposes of the system.

FIG. 1 illustrates a block diagram of a system 100 for modifying storage system configuration using artificial intelligence.

The system 100 comprises a storage controller 102, a machine learning (ML) engine 104, an expert system 106, storage parameters 110, a configuration parameters table 130 and storage disks 140. The client side comprises client devices 120 that use the storage system 100 to store client data 122. Specifically, according to one aspect, the client data 122 may be received at the storage controller 102 upon requests for access or storage by client devices 120. The storage controller 102 may store the client data 122 on the one or more storage disks 140 associated with the storage system 100.

In some aspects, the storage system 100 may degrade in performance until it is below a predetermined threshold, or an event may occur that threatens operation or reduces performance of the storage system 100, such as a DDOS attack. The predetermined threshold may be a value of a single parameter of the storage system 100 or a combination of parameters of various components of the system 100. In one aspect, in response to such performance degrading or system threatening events, the storage system 100 may dynamically adapt by analyzing historical configuration information associated with such degraded performance to determine a source of the problem, and configuration information which historically corrected the performance problem, either within the storage system 100 or from external systems. Such external systems may be third party tools and services programmed to help protect a server or storage against a DDOS attack. The storage system 100 may then retrieve the configuration stored in the configuration parameters table 130 that corrected the problem and apply these configurations across software and hardware components of the system 100, based on the historical analysis. In another aspect, the storage system 100 may recognize patterns that may eventually lead to performance that is less than a predetermined threshold, and automatically configure parameters to minimize the time period of the degraded performance and the impact on clients.

In one aspect, the expert system 106 may suggest changes to the configuration of the system 100. The storage controller propagates the suggested changes throughout the system 100 and updates the storage parameters 110 to respond to an event that has degraded performance of the storage system 100. Instead of a technical expert or system administrator manually modifying the parameters, the expert system 106 may select the best configuration parameters because the expert system 106 is able to identify certain patterns of degrading performance over time using machine learning using the machine learning (ML) engine 104. Based on the identified patterns, the expert system 106 can locate parameter(s) and their corresponding values that correct the performance problem, and/or improve system performance above a predetermined threshold. These ideal parameters may be stored in a local or remote data store or database, or any storage structure for future retrieval. In one aspect, the ideal parameters for a particular storage system may be determined based on analysis of historical data of the configuration parameters and status of the system 100. In one aspect, the expert system 106 is configured to optimize for a particular variable or class of variables associated with a system being optimized, e.g., latency, throughput, or a combination thereof. In this aspect, an administrator may set the type of optimization, or the optimization can be a result of the machine learning by the ML engine 104. In either instance, the expert system 106 may identify patterns of system degradation and suggest and/or set ideal parameters for the system being optimized.

According to one aspect, the ML engine 104 and the expert system 106 service multiple storage systems and provide parameter configuration advice to the multiple systems based on the event, configuration and pattern history of each individual system. In some aspects, the ML engine 104 and the expert system 106 may provide configuration information to each system based on system-level experiences, in addition to events occurring in other systems. Therefore the ML engine 104 collects configurations from multiple systems and may store configuration information, system health information and the like. The expert system 106 may then have a large volume of varied information from which to identify patterns of degradation, parameters and configurations associated with those parameters, and configurations/parameters that eliminated or reduced the degradation, over a period of time. The expert system 106 may then suggest configuration changes to improve performance of a first system based on historical analysis of parameters and configuration of a second system (and/or a third system, etc.).

According to one aspect, the ML engine 104 is implemented as a set of machine learning services, each service responsible for a single task. For example, a single ML service may be responsible for analyzing a single parameter, such as a connection interface parameter, data caching parameter, data clustering parameter or data distribution parameter, across one or more storage systems. Based on how the data is written in the storage, as indicated by the parameters listed above, the ML service may generate parameter configurations for reducing performance degradation. Another service of the ML engine 104 may be responsible for analyzing all parameters, generating predictions, rules and the like. Each service of the ML engine 104 can be assigned to a particular parameter or a group of parameters. In some aspects, the ML engine 104 comprises multiple components, each focusing on distinct parameters: overall system health, environmental or hardware health, though not limited thereto.

In one aspect, hardware level parameters 116 of one or more storage system are updated by performing firmware updates and system level parameters 112 are performed by programmatically editing text files, executing configuration software, or the like. According to one aspect, hardware or software that has been modified may be restarted or reinitialized to give effect to the parameter changes. Some changes to environment level parameters 114 may take effect immediately, while others may include resetting hardware or the like of the various systems.

Figure 2:
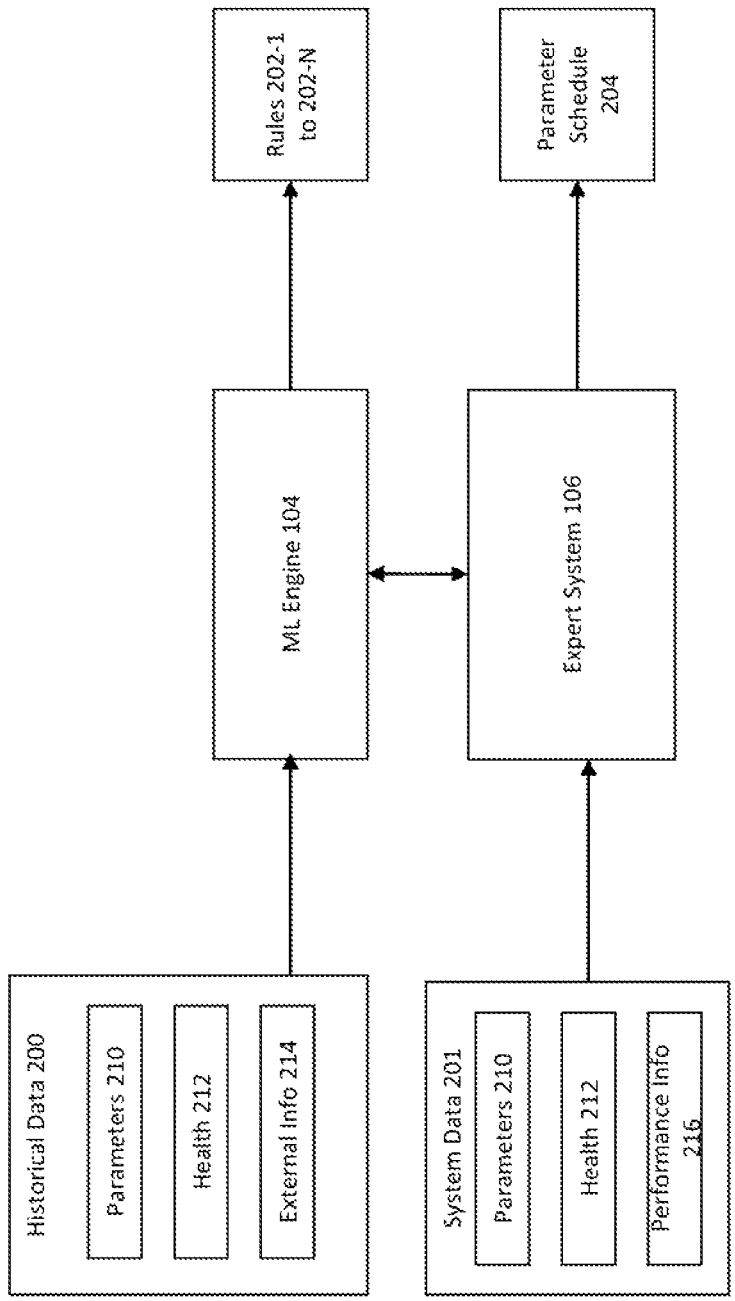
FIG. 2 is a block diagram of the machine learning engine in accordance with exemplary aspects of the present disclosure.

As shown in FIG. 2, the ML engine 104 collects all parameters 210 of the system 100 and corresponding health 212 of the system 100 at various times of operation of the system 100. Additionally the ML engine 104 collects external information 214 from external systems 150. Information related to system 100 and the external systems 150 comprises at least statistics, scenarios, events and the like relating to data storage. For example, a scenario might include information that indicates that for system 100 a set of hardware parameters are configured to a predetermined value, that the system level parameters are configured to other predetermined values, the performance level of the storage system 100, and that the external systems 150 has degraded performance. According to one aspect, degraded performance may be measured by determining that particular goals and purposes of the system are not being met, or only have a realization of a particular percentage, less than a predetermined threshold value, within a predetermined deviation. Collectively, the data collected by the expert system 106 is referred to as historical data 200. In exemplary aspects of the present disclosure, the statistics may reflect any information regarding stored data. For example, the statistics may reflect stored and/or transmitted data volumes depending on certain users, time, and data type. Statistics may also comprise data access statistics such as how often any particular pieces of data are accessed/written/modified. Furthermore, statistics may include typical data file size—e.g., many small files, such as logs, or large data files, such as video/sound/image files and the like. Statistics may also reflect any combinations between data and users and/or may be combined into typical usage scenarios. For example, collected statistics may indicate that different user (client) groups write and/or upload data at different times of day, different locations on disk, and the like. In one aspect, the storage system 100 is preconfigured for a particular usage scenario—for example, high volume use, high security, or the like. If the usage scenario changes from high volume to high security, the configuration for software, hardware and system parameters may be very different, and the expert system 106 adapts accordingly by generating configuration settings based on the machine learning performed by the ML engine 104.

The ML engine 104 uses machine learning algorithms (e.g., classification and regression) to recognize patterns in the parameters and corresponding health of the storage system 100 over time. In one aspect, the ML engine 104 analyzes the historical data to, for example, correlate particular parameter/configuration settings with degraded performance. As the amount of data fed to the ML engine 104 increases, the more pattern associations the ML engine 104 can make between parameters, configuration and the performance of one or more systems (e.g., storage systems, or the like). Additionally, the ML engine 104 may correlate malicious attacks on the system 100 and particular parameter/configuration to recognize which parameters worked best for instances of malicious attacks, historically. The ML engine 104 may similarly identify, using classification, parameter settings which improved performance of one or more systems over time, and later may suggest or apply these parameters to systems with performance concerns, or similar historical parameter configurations based on analysis of previously recognized malicious attacks and the parameters and configurations at the time of the attacks. As more data is collected by the ML engine 104, the ML engine 104 may determine which parameters may lead to degraded performance or vulnerability of a system and which may merely be incidental to degraded performance, thus continuously eliminating false positives and perfecting the accuracy of a set of configurations and parameters that improve performance, prevent attacks or the like.

Figure 3:
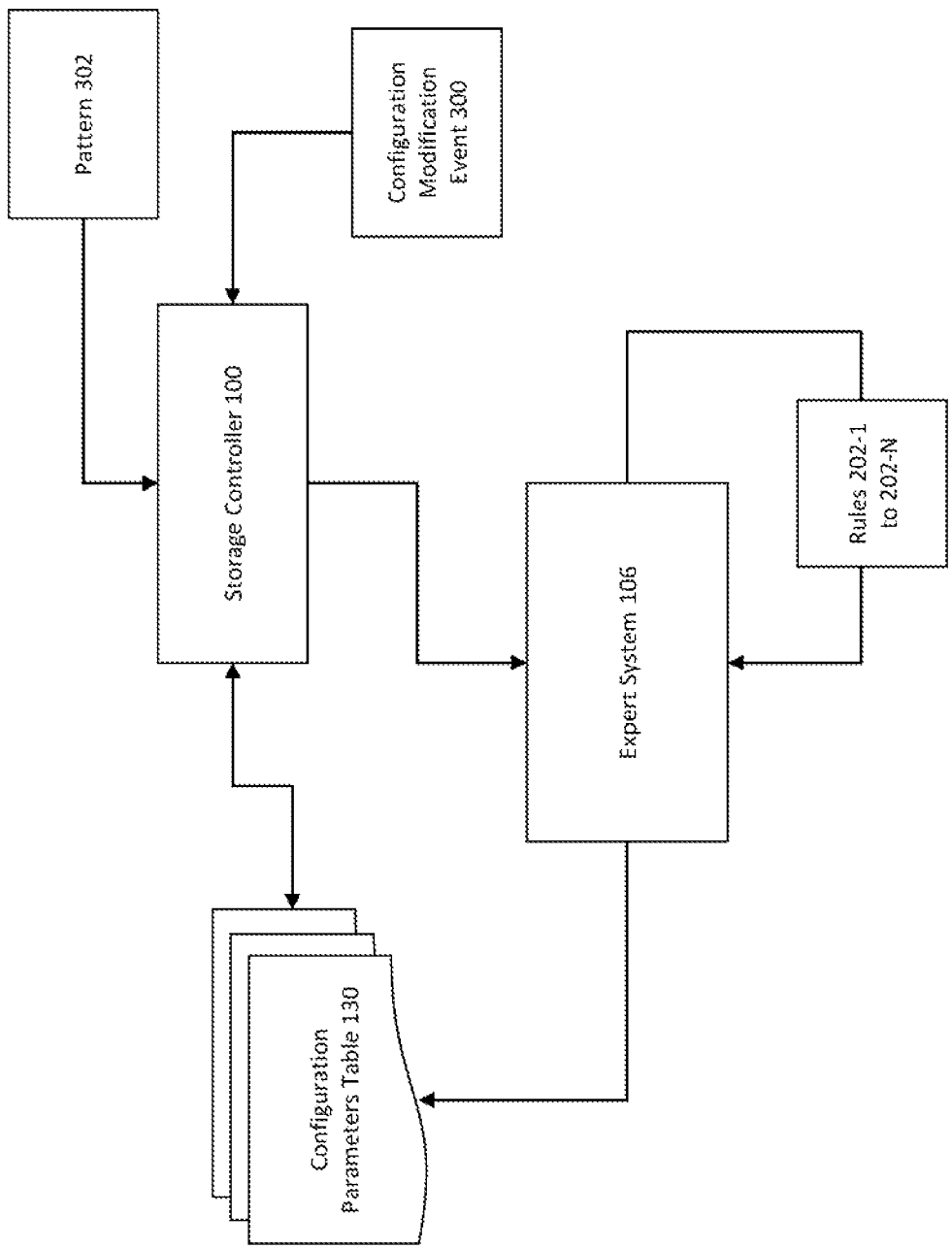
FIG. 3 is a block diagram of the expert system in accordance with exemplary aspects of the present disclosure.

In one aspect, the collected system data 201 is provided to the expert system 106. The collected data may include one or more of health information 212, performance information 216, parameter information 210 and other metrics. The system data 201 may also comprise all aspects of the operation of the storage system 100 such as workload, traffic and the like. Any operational aspects of the system 100 that are observable may be monitored and provided to the expert system 106. The ML engine 104 generates a set of patterns, or rules 202-1 to 202-N based on all of the collected information from the storage system 100, the external systems 150 and the expert system 106. The rules 202-1 to 202-N are a collection of policies that include parameter/configuration/system information change that can be compared with existing system information to determine that similar performance issues may arise. At a later time, an event or a pattern of events, e.g., an event that is recognized as degrading performance by matching against one or more of the rules 202-1 to 202-N may occur at the storage system 100. For example, configuration modification event 300 or pattern 302 as shown in FIG. 3 may occur and may result in a loss of performance of the storage system 100. If it is determined that similar performance issues may arise, the expert system 106 may provide corrective configuration and/or parameters to improve system performance.

The rules 202-1 to 202-N may change over time as more data about the system 100 is collected. The ML engine 104 may add more rules, remove rules, or modify rules based on the new collected information. As the database of information increases, the rules will become more precise and apply to more usage scenarios, possible system events and the like. According to one aspect, the Expert system 106 may employ artificial intelligence to apply the current event or pattern of events to the rules created by the ML engine 104 to determine which rules match, and the expert system 106 may predict upcoming events based on the pattern of previous events which impacted performance of the system 100 in order to preemptively modify the configuration of system 100 by predicting optimal configuration changes to make in the configuration parameter table 130.

The expert system 106 may also use artificial intelligence to create a parameter schedule 204 in some aspects. The parameter schedule 204 is a schedule of when to modify parameter values for a system such as system 100, which values to modify the parameters to, and which components should be restarted, stopped, modified, or the like. The expert system 106 may use the previous historical patterns recognized by the system 100 to predict a schedule of parameter changes such as the parameter schedule 204 that will be optimal for an upcoming period of time, given historical loads and resource usage in the past. As time progresses, the storage controller 102 will apply parameter changes according to the parameter schedule 204. The expert system 106 may also modify the parameter schedule 204 over time based on newly collected system data and event information analyzed by the ML engine 104. In one aspect, the expert system 106 monitors the load of the system being configured to determine whether the load is sequential or random. In sequential operations, a portion of the I/O request may be delayed in order to wait further for a sequentially adjacent request. For example, two or more requests may be attached (e.g., associated with) a single larger sequential request if the storage controller 102 waits for these later requests in a queue of requests. In some cases, this maximizes throughput, but can impact latencies, so the system administrator can prioritize according to the effect desired to be achieved.

As illustrated in FIG. 3, the storage controller 102 may be notified or may detect a configuration modification event 300, or a pattern of events 302. The configuration modification event 300 is an event that may degrade performance of a storage system, e.g. storage system 100. The pattern of events 302 is a larger pattern of events that The storage controller 102 passes the event or the pattern onto the expert system 106. The expert system 106 compares the event 300, or pattern of events 302, to the rules 202-1 to 202-N generated by the ML engine 104, to determine the core problem causing the performance issue. Once the core problem is determined by the expert system 106, the ML engine 104 is consulted to retrieve a set of configuration parameter values that have corrected such problems historically. The configuration parameter table 130 is updated by the expert system 106 based on the retrieved configuration parameters. The storage controller 102 then applies the updated parameters to the storage parameters 110. Alternatively, the expert system 106 transmits the configuration parameters to the storage controller 102 that applies the configuration directly.

The storage parameters 110 of the storage system 100 comprise at least system level parameters 112, environmental level parameters 114 and hardware level parameters 116. The system level parameters 112 control how a data storage system stores data and communicates with different hardware. System level parameters 112 may comprise data block size, cache size, RAID type, selection of primary nodes for writing files (for cluster based storage systems) and data access prioritizations and quotas for users/clients, among others. Environmental level parameters 112 may comprise network protocol parameters related to TCP/IP, data transmission (e.g., maximum transmission unit, or MTU), and the like. Hardware level parameters 116 may comprise parameters of hard disk drive (HDD) controllers, parameters of the RAID controllers and the like. Hardware level parameters may control operation of any hardware controllers used for data transmission such as SCSI controllers, Fiber channel controllers, SATA controllers and the like. In one aspect of the disclosure, the expert system 106 may modify any of the previous parameters in the configuration parameters table 130 for predetermined periods of time and monitor the effect of the parameter changes to the goals of the overall system 100. If the parameter changes are not achieved the expected goals, then the expert system 106 re-evaluates parameter changes in light of historic data, or asks the ML engine 104 to analyze or provide other parameter changes that have historically corrected performance issues for the affected system 100. In some aspects, the modification of parameters may be random, prescheduled, or a combination of both.

Figure 4:
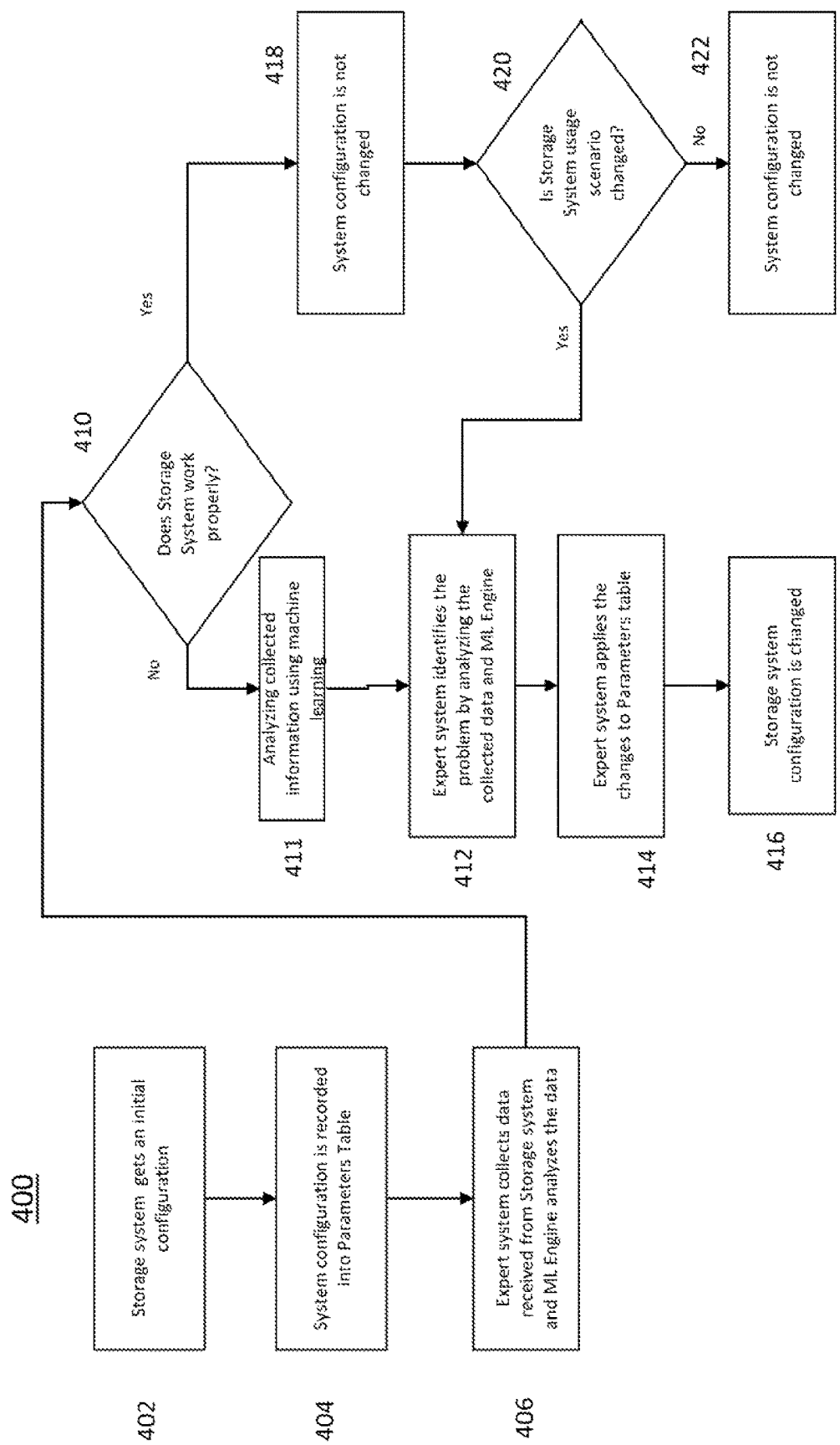
FIG. 4 is a flowchart for a method for modifying storage system configuration in accordance with exemplary aspects of the present disclosure.

FIG. 4 is a flowchart for a method 400 for modifying storage system configuration in accordance with exemplary aspects of the present disclosure.

The method 400 begins at step 402 where the storage system 100 receives an initial configuration. This is the configuration that system administrators or expert technicians have set according to their professional analysis. A portion of the parameters may be set to default values from the vendors, such as hardware device parameters, network parameters, software parameters and the like.

At step 404, the configurations are recorded into the configuration parameter table 130 shown in FIG. 1 by the storage controller 102. The method then proceeds to step 406. In step 406, the expert system 106 gathers historical data from the storage system 100 and external systems 150. The ML engine 104 analyzes the data received to generate one or more rules based on the collected configuration and system data.

The method proceeds to 410, where the storage controller determines whether the storage system is working properly or not. Some of the considerations in this determination include determining whether the system is meeting its intended goals and purposes, for example, processing a particular amount of requests in a predetermined time period, adhering to a task schedule set by an administrator in completing a set of tasks, realization percentage, efficiency, and the like. In one aspect, a system is considered to be working properly if the system performs all assigned tasks, has no errors and does not deny service. An improperly functioning system may have a significantly increased workload resulting in system failure or performance degradation, or the like. In one aspect, an administrator of the system 100 may modify what constitutes proper operation of the system 100, or various portions of the system 100, while in other aspects, the ML engine 104 can analyze previous patterns of operation of the system 100 using machine learning and a determination of proper operation can be made based on this analysis. In one aspect, the ML engine 104 compares the current pattern of operation of the storage system to determine whether it is similar to a previous pattern that degraded the performance of the storage system 100 or made the storage system 100 more susceptible to malicious attacks. The configuration changes that were made to correct the previous degraded performance may be applied in this instance as well. According to one aspect, in order to determine whether the storage system 100 is not meeting its goals, the expert system 106 may determine that the storage system has not processed more than a predetermined threshold amount of requests within a predetermined time period. The Expert system 106 will then determine whether the efficiency of the storage system is below a predetermined threshold efficiency value. If this is true, the expert system 106 will search for a historical pattern of operation that has degraded performance, similar to the current pattern of operation of the storage system, and apply similar corrective modifications to configuration parameters.

If, at 410, the storage controller 102 determines that the system is not working properly, the method proceeds to 412. Subsequently, at 411, the ML engine 104 analyzes the collected information to determine patterns between settings and parameters of the system and the collected health information of the system to generate rules, or guidelines, which indicate how the setting (in some aspects, how the settings over time) of the system will be modified. At 412, the storage controller 102 directs the expert system 106 to identify the problem with the storage system 100 by comparing the event with the collected data and rules generated by the ML engine 104.

Once the problem is determined, and the configuration changes of parameters that correct the problem are determined, the method proceeds to 414 where the expert system 106 updates the configuration parameter table 130 with the configuration changes. The storage controller 102 then determines that the configuration parameters table 130 has been modified, and applies the changes to the entire system 100 at 416.

However, when the storage system 100 is determined to be working properly (as described in detail above) at 410, method 400 proceeds to 418, where the storage controller 102 does not perform any configuration changes to the system 100.

At 420, the storage controller 102 determines whether the storage system usage scenario has changed. If the storage usage scenario has not changed, at 422 the storage controller 102 does not perform any further changes. However, if at 420, the usage scenario of the system 100 has changed, the method proceeds to 412, where expert system 106 is invoked again to determine a root problem and modify the configuration parameters table 130. In one aspect, the storage system 100 is preconfigured for a particular usage scenario—for example, high volume use, high security, or the like. If the usage scenario changes from high volume to high security, the configuration for software, hardware and system parameters may be very different, and the expert system 106 adapts accordingly by generating configuration settings based on the machine learning performed by the ML engine 104.

Figure 5:
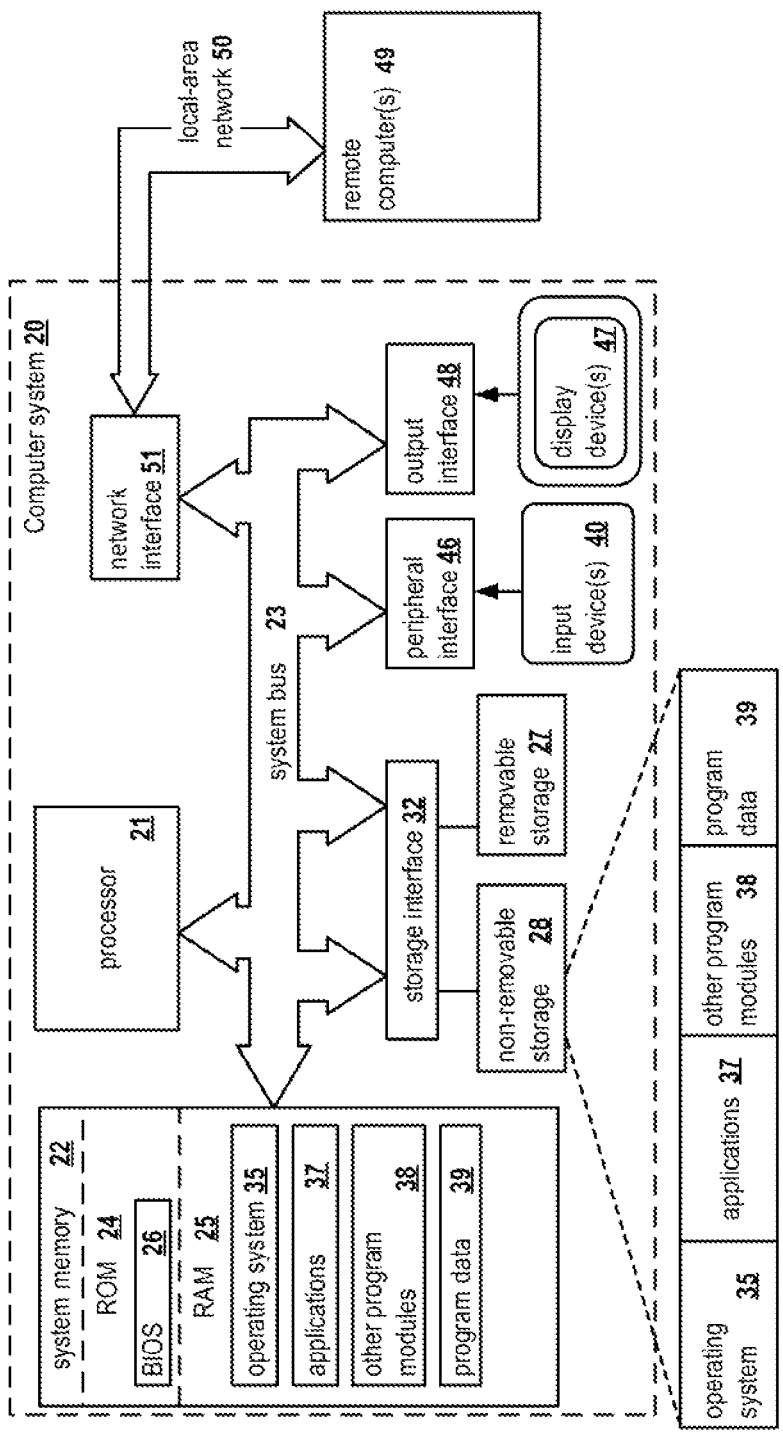
FIG. 5 is a block diagram of a general-purpose computer system on which the disclosed systems and method can be implemented.

FIG. 5 is a block diagram illustrating a computer system 20 on which aspects of systems and methods for modifying storage system configuration using artificial intelligence may be implemented in accordance with an exemplary aspect. It should be noted that the computer system 20 can correspond to the various components of system 100, for example storage controller 102, ML engine 104 and expert system 106, described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 5, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for modifying configuration of a storage system using artificial intelligence, comprising:
   collecting, over a period of time, health and parameter information of the storage system;
   predicting, using a machine learning algorithm, upcoming events that may degrade performance of the storage system based on the health and parameter information;
   determining that the storage system will not operate in accordance with a set of goals based on the upcoming events;
   in response to determining that the storage system will not operate in accordance with the set of goals, generating parameter changes; and
   applying the parameter changes to the storage system.

2. The method of claim 1, further comprising:
   subsequent to applying the parameter changes, collecting additional health and parameter information to determine whether the set of goals have been met;
   in response to determining that the set of goals have not been met, generating different parameter changes; and
   applying the different parameter changes to the storage system.

3. The method of claim 1, wherein the parameter changes have historically corrected performance issues to achieve the set of goals.

4. The method of claim 1, wherein the machine learning algorithm is configured to compare the health and parameter information to a historical pattern of operation that has led to degraded performance.

5. The method of claim 1, further comprising:
   determining whether a usage scenario of the storage system has changed to a new usage scenario;
   identifying one or more parameter changes that will increase performance of the storage system for the new usage scenario; and
   applying the one or more parameter changes to the storage system.

6. The method of claim 1, further comprising:
   generating, based on the collected health and parameter information, a schedule of the parameter changes for a future period of time; and
   applying the parameter changes over the period of time based on the schedule.

7. The method of claim 1, wherein determining that the storage system is not operating in accordance with the set of goals further comprises one or more of:
   determining that the storage system has not processed more than a predetermined threshold amount of requests within a predetermined time period;
   determining that an efficiency of the storage system is below a predetermined threshold efficiency value; and
   determining that a current pattern of operation of the storage system is similar to a historical pattern of operation that degraded performance.

8. The method of claim 1, wherein configuration of the storage system comprises one or more of system level parameters, environmental level parameters, and hardware level parameters.

9. The method of claim 8, wherein the environmental level parameters comprise network protocol parameters.

10. The method of claim 8, wherein the hardware level parameters comprise one or more of parameters of hard disk drive (HDD) controllers and parameters of RAID controllers.

11. A system for modifying configuration of a storage system using artificial intelligence, comprising:
    a hardware processor configured to:
    collect, over a period of time, health and parameter information of the storage system;
    predict, using a machine learning algorithm, upcoming events that may degrade performance of the storage system based on the health and parameter information;
    determine that the storage system will not operate in accordance with a set of goals based on the upcoming events;
    in response to determining that the storage system will not operate in accordance with the set of goals, generate parameter changes; and
    apply the parameter changes to the storage system.

12. The system of claim 11, wherein the hardware processor is further configured to:
    subsequent to applying the parameter changes, collect additional health and parameter information to determine whether the set of goals have been met;
    in response to determining that the set of goals have not been met, generate different parameter changes; and
    apply the different parameter changes to the storage system.

13. The system of claim 11, wherein the parameter changes have historically corrected performance issues to achieve the set of goals.

14. The system of claim 11, wherein the machine learning algorithm is configured to compare the health and parameter information to a historical pattern of operation that has led to degraded performance.

15. The system of claim 11, wherein the hardware processor is further configured to:
    determine whether a usage scenario of the storage system has changed to a new usage scenario;
    identify one or more parameter changes that will increase performance of the storage system for the new usage scenario; and
    apply the one or more parameter changes to the storage system.

16. The system of claim 11, wherein the hardware processor is further configured to:
    generate, based on the collected health and parameter information, a schedule of the parameter changes fora future period of time; and
    apply the parameter changes over the period of time based on the schedule.

17. The system of claim 11, wherein determining that the storage system is not operating in accordance with the set of goals further comprises one or more of:

determining that the storage system has not processed more than a predetermined threshold amount of requests within a predetermined time period;

determining that an efficiency of the storage system is below a predetermined threshold efficiency value; and determining that a current pattern of operation of the storage system is similar to a historical pattern of operation that degraded performance.

18. The system of claim 11, wherein configuration of the storage system comprises one or more of system level parameters, environmental level parameters, and hardware level parameters.

19. The system of claim 18, wherein the environmental level parameters comprise network protocol parameters.

20. A non-transitory computer-readable medium, storing instructions thereon for modifying configuration of a storage system using artificial intelligence, the instructions comprising:

collecting, over a period of time, health and parameter information of the storage system;

predicting, using a machine learning algorithm, upcoming events that may degrade performance of the storage system based on the health and parameter information;

determining that the storage system will not operate in accordance with a set of goals based on the upcoming events;

in response to determining that the storage system will not operate in accordance with the set of goals, generating parameter changes; and applying the parameter changes to the storage system.

\* \* \* \* \*